(12) United States Patent
Mayer et al.

(10) Patent No.: US 8,771,598 B2
(45) Date of Patent: Jul. 8, 2014

(54) AMMONIA STORAGE SYSTEM

(75) Inventors: Felix Mayer, Stäfa (CH); Mark Hornung, Stäfa (CH); Lukas Bürgi, Zürich (CH); Pascal Gerner, Zürich (CH)

(73) Assignee: Sensirion AG, Stafa (CH)

( * ) Notice: Subject to any disclaimer, the term of this patent is extended or adjusted under 35 U.S.C. 154(b) by 418 days.

(21) Appl. No.: 12/653,490

(22) Filed: Dec. 15, 2009

(65) Prior Publication Data

US 2010/0172816 A1   Jul. 8, 2010

(30) Foreign Application Priority Data

Jan. 2, 2009   (EP) ..................................... 09000024

(51) Int. Cl.
*C01C 1/00* (2006.01)
*B01L 5/00* (2006.01)

(52) U.S. Cl.
USPC ........................... 422/82.12; 422/50; 422/500

(58) Field of Classification Search
USPC ....................... 422/82.12, 102, 103
See application file for complete search history.

(56) References Cited

U.S. PATENT DOCUMENTS

| | | |
|---|---|---|
| 4,373,386 A | 2/1983 | Schuddemat et al. |
| 4,501,145 A | 2/1985 | Boegli et al. |
| 4,693,116 A | 9/1987 | Miura et al. |
| 4,712,996 A | 12/1987 | Adams et al. |
| 4,885,938 A | 12/1989 | Higashi |
| 4,909,078 A | 3/1990 | Sittler et al. |
| 4,961,348 A | 10/1990 | Bonne |
| 5,237,523 A | 8/1993 | Bonne et al. |
| 5,339,687 A | 8/1994 | Gimson et al. |
| 5,404,753 A | 4/1995 | Hecht et al. |
| 5,406,841 A | 4/1995 | Kimura |
| 5,515,295 A | 5/1996 | Wang |
| 5,515,714 A | 5/1996 | Sultan et al. |
| 5,533,412 A | 7/1996 | Jerman et al. |
| 5,596,219 A | 1/1997 | Hierold |
| 5,804,720 A | 9/1998 | Morimasa et al. |

(Continued)

FOREIGN PATENT DOCUMENTS

| | | |
|---|---|---|
| DE | 2311103 | 1/1984 |
| DE | 10129300 | 6/2000 |

(Continued)

OTHER PUBLICATIONS

"Scaling of Thermal CMOS Gas Flow Microsensors; Experiment and Simultation", XP000689255, F. Mayer et al., Nov. 2, 1996, pp. 116-121.

(Continued)

*Primary Examiner* — Christine T Mui
(74) *Attorney, Agent, or Firm* — Cooper & Dunham, LLP

(57) ABSTRACT

A system for storing ammonia comprises gas detector that is able to detect gases other than ammonia. The system further comprises thermally activatable ammonia stores, which can be activated to release ammonia upon heating. When the ammonia stores are not heated, the system is below ambient pressure and any leak will cause external gas to enter the system. Therefore, the gas detector is used to detect the presence of such external gas, which allows to detect leaks. The gas detector may be embodied as a thermal detector using a single heater and two temperature sensors for detecting a gas flow as well as external gas.

20 Claims, 1 Drawing Sheet

(56) References Cited

U.S. PATENT DOCUMENTS

| | | | |
|---|---|---|---|
| 5,830,372 | A | 11/1998 | Hierold |
| 5,980,102 | A | 11/1999 | Stulen et al. |
| 6,209,402 | B1 | 4/2001 | Yamada |
| 6,349,596 | B1 | 2/2002 | Nakada et al. |
| 6,387,336 | B2 * | 5/2002 | Marko et al. .................. 423/212 |
| 6,650,325 | B1 | 11/2003 | Voorhies et al. |
| 6,662,121 | B1 | 12/2003 | Oda et al. |
| 6,782,743 | B2 | 8/2004 | Koike et al. |
| 6,920,786 | B2 | 7/2005 | Mayer et al. |
| 7,188,519 | B2 | 3/2007 | Hornung et al. |
| 2004/0031263 | A1 * | 2/2004 | Binder et al. .................. 60/286 |
| 2004/0099057 | A1 | 5/2004 | Hornung et al. |
| 2006/0026949 | A1 | 2/2006 | Takahata et al. |
| 2007/0144151 | A1 | 6/2007 | Lueders et al. |
| 2007/0241093 | A1 | 10/2007 | von Waldkirch et al. |
| 2008/0066453 | A1 * | 3/2008 | Oberski et al. .................. 60/286 |
| 2009/0028845 | A1 | 1/2009 | Maes et al. |
| 2009/0123361 | A1 | 5/2009 | Johannessen et al. |
| 2009/0249869 | A1 | 10/2009 | Meier et al. |
| 2010/0021780 | A1 | 1/2010 | Johannessen et al. |
| 2010/0024403 | A1 | 2/2010 | Johannessen et al. |
| 2010/0047638 | A1 | 2/2010 | Johannessen |

FOREIGN PATENT DOCUMENTS

| | | | |
|---|---|---|---|
| EP | 1065475 | | 1/2001 |
| EP | 1426740 | | 11/2002 |
| EP | 1772717 | | 4/2007 |
| EP | 1840535 | | 10/2007 |
| EP | 1 992 397 | A1 * | 11/2008 ............ B01D 53/90 |
| GB | 1544818 | | 4/1979 |
| JP | 8110317 | | 4/1996 |
| WO | WO0118500 | | 3/2001 |
| WO | WO0198736 | | 12/2001 |
| WO | WO2006081824 | | 8/2006 |
| WO | WO2007000170 | | 1/2007 |

OTHER PUBLICATIONS

"The Future Domestic Gas Meter: Review of Current Developments", Furio Cascetta et al., Apr. 13, 1994, pp. 129-145.

"Single-Chip CMOS Anemometer", F. Mayer et al., 1997, pp. 895-898.

"AMMINEX, Ammonia and Hydrogen Enabling Technologies", Press Release, Copenhagen, Dec. 21, 2009, 1 Page.

"VDI Conference on NOx Control", Nürnberg, Germany, Jul. 1, 2009. Presentation by Dr. Tue Johannessen: "Compact Amonia Storage for SCR Nox Control", pp. 1-28.

"Solid Ammonia as Energy Carrier: Current Status and Future Prospects", by Debasish Chakraborty et al, published on Fuel Cells Bulletin, Oct. 2009, pp. 12-15.

"Commercial Vehicle Diesel Engines with Exhaust Gas Aftertreatment: Daimler Chrysler Develops the Next Generation of SCR Technology", Edith Meissner, 8 pages, May 4, 2004 (English and German Versions).

U.S. Appl. No. 12/583,747, filed Aug. 25, 2009.

* cited by examiner

AMMONIA STORAGE SYSTEM

CROSS REFERENCE TO RELATED APPLICATIONS

This application claims the priority of European Patent Application 09000024.1, filed Jan. 2, 2009, the disclosure of which is incorporated herein by reference in its entirety.

BACKGROUND OF THE INVENTION

The invention relates to an ammonia storage system comprising a thermally activatable ammonia store as well as to a method for operating such a system.

Ammonia storage systems are used in a wide area of applications. However, one area of particular interest is the storage of ammonia in vehicles run by diesel powered engines, where the ammonia can be used in a Selective Catalytic Reduction (SCR) process for the catalytic decomposition of $NO_x$ compounds.

A particularly advantageous class of ammonia storage systems is based on thermally activatable ammonia stores where ammonia is physically or chemically bound in a solid storage matrix. Heating the matrix increases the vapour pressure of ammonia and allows to release ammonia at well-defined and secure rates. Examples of such systems are e.g. described in WO 2006/081824 and WO 2007/000170 by Amminex A/S, Denmark.

However, for any type of ammonia storage system, there should be leak detectors that-are able to detect leakage of ammonia from the system. Such leak detectors can e.g. be formed by ammonia detectors located outside the storage system.

SUMMARY OF THE INVENTION

The problem to be solved by the present invention is therefore to provide an ammonia storage system with improved leak detection.

This problem is solved by the system and method according to the independent claims.

According to a first aspect of the invention, there is provided a system comprising a gas detector adapted to detect the presence of a gas other than ammonia in the ammonia containing section of the system.

This concept is in contrast to leak detection systems where ammonia detectors are placed outside the ammonia containing section of the system, or where pressure detectors are provided within the ammonia containing section of the system to detect leaks. The present scheme relies on the fact that in systems with thermally activatable ammonia stores the ammonia pressure can drop to a level below ambient pressure when the system is in idle or inactive mode, i.e. when the ammonia store is not being heated. In this case, a leak in the system leads to outside gas entering the ammonia containing section, which then can be detected by the gas detector provided.

According to a second aspect of the present invention there is provided a method in which the gas detector is operated at least when the ammonia store is not being activated, i.e. not being heated, in order to detect the presence of gas other than ammonia.

The gas detector can advantageously be any detector that allows to detect the presence of the "gas other than ammonia", with this term specifying any gas likely to leak into the ammonia containing section of the system, in particular nitrogen and/or oxygen.

In a particularly advantageous embodiment the gas detector is a thermal detector that measures a parameter depending on one of the thermal conductivity and the heat capacity of the gas in the ammonia containing section of the system. When an external gas enters this section the thermal conductivity and the heat capacity change which can be used to detect the presence of the external gas.

The gas detector can advantageously be combined with a thermal flow sensor. In particular, the two detectors can have a common heater and/or common temperature sensors. Hence, a single device, e.g. integrated on a single semiconductor chip, can be used for both flow metering as well as leak detection.

A system according to an embodiment of the invention may especially be suited for being used as an ammonia source in a vehicle, but it is also suited for other applications.

BRIEF DESCRIPTION OF THE DRAWINGS

The invention will be better understood and objects other than those set forth above will become apparent from the following detailed description of advantageous embodiments of the present invention. Such description makes reference to the annexed drawings, wherein.

DETAILED DESCRIPTION OF PREFERRED EMBODIMENTS

Figure 1:
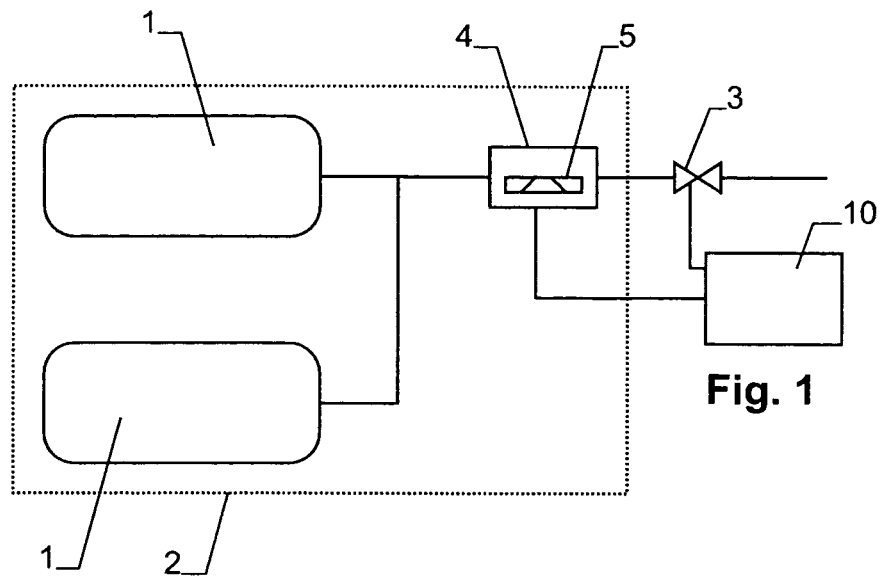
FIG. 1 shows a block diagram of an ammonia storage system according to an embodiment of the present invention.

System Overview:

FIG. 1 shows an exemplary embodiment of a system according to the invention. The system is a device for the storage and controlled release of ammonia. It comprises at least one ammonia store 1 containing a matrix storing ammonia. Ammonia from the matrix can be released by heating the store by means of a heater (not shown).

The stores 1 are part of an ammonia containing section 2 of the system, which includes various ducts, valves and other elements as required by the specific application.

In the embodiment of FIG. 1, a valve 3 is provided at the outlet of the system. When valve 3 is opened, ammonia can flow out of the system. In general, valve 3 is only opened when the stores 1 are activated, in which case the ammonia containing section 2 of the system is under elevated pressure.

The system of FIG. 1 further comprises a combined flow and gas detector 4 for measuring a gas flow as well as for detecting gases other than ammonia in the ammonia containing section 2. Advantageously, detector 4 is arranged at a duct leading to valve 3, with valve 3 being downstream from the detector, and with "downstream" designating the direction of ammonia flow when ammonia is leaving the system through valve 3.

The operation of the system is controlled by a system controller 10 as shown.

The function of the system is, in short, as follows. In regular operation, for releasing ammonia from the system, one or several of the stores 1 are heated to build up ammonia pressure inside ammonia containing section 2. Then, valve 3 is opened and ammonia is released as required. If the system is required to generate a variable ammonia flow, valve 3 can be a variable valve or it can be operated in pulsed manner using a pulse width modulation technique.

When ammonia is flowing through value 3, detector 4 can be used for measuring its mass flow. The signal from detector 4 can e.g. be used for monitoring the gas flow or for controlling the gas flow in a closed control loop.

When no ammonia is required, the stores 1 are not heated and valve 3 is closed. In that case, if the system contains no leaks, the gas within ammonia containing section 2 will generally be pure ammonia. Its pressure, however, may be well below ambient pressure, e.g. 1 bar. If ammonia containing section 2 has a leak, external (ambient) gas will therefore enter ammonia containing section 2. Such external gas can be detected by detector 4. When detector 4 detects a gas other than ammonia, an alert can be issued or other appropriate measures may be taken.

System controller 10 advantageously operates detector 4 to detect external gas at least when the ammonia stores 1 are not activated, but it may also operate detector 4 to detect external gas when the system is operating because, neither at rest nor in operation, detector 4 should be able to detect any external gas in section 2.

Gas and Flow Detector 4:

As schematically illustrated in FIG. 1, gas and flow detector 4 can e.g. comprise a semiconductor chip 5 with sensors and electronics integrated thereon.

Figure 2:
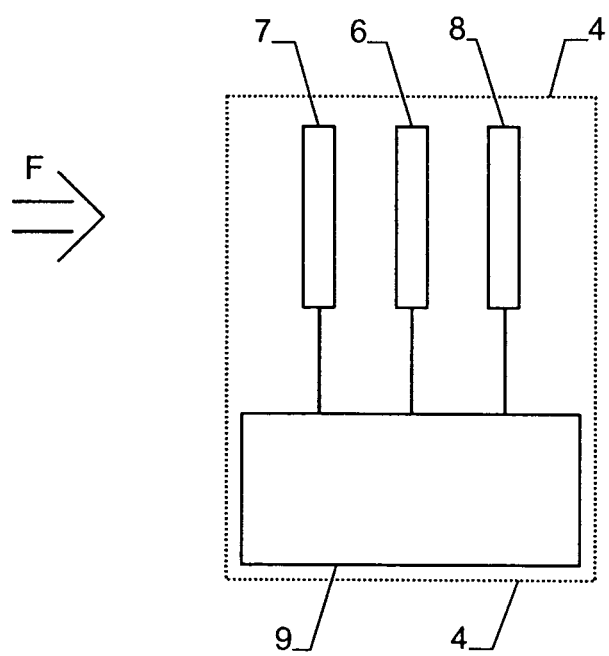
FIG. 2 shows a block diagram of a combined flow and gas detector used in a system according to an embodiment of the present invention.

If, as it is the case in the advantageous embodiment of FIG. 1, detector 4 is a combined gas and flow detector, it may e.g. be designed as shown in FIG. 2. It comprises a heater 6 symmetrically arranged between two temperature sensors 7 and 8. The design of the heater 6 and the temperature sensors 7, 8 can e.g. be as shown in EP 1840535 or WO 01/98736, with heater 6 arranged on a membrane suspended over an opening or recess in the semiconductor chip and the temperature sensors 7, 8 being arranged downstream and upstream of heater 6.

In operation, heater 6 is heated and creates an inhomogeneous temperature distribution in its neighbourhood, thereby changing the temperature at the location of the temperature sensors 7, 8. A flow as indicated by arrow F of FIG. 2 will lead to a decrease of the temperature at the location of upstream temperature sensor 7 and to an increase (low flow) or decrease (high flow) of the temperature at the location of downstream temperature sensor 8.

As shown in FIG. 2, detector 4 further comprises a control unit 9, which calculates the gas flow from the difference between the signals from the temperature sensors 7, 8 as described in EP 1840535, US 2004/0099057 or WO 01/98736. Control unit 9 can e.g. be integrated on the semiconductor chip of detector 4, but it may also be an external device or it may be implemented as part of system controller 10.

As mentioned, detector 4 not only measures the mass flow of ammonia in the duct leading to valve 3, but it also can be used as a detector for detecting the presence of a gas other than ammonia.

For example, the method as described in US 2004/0099057 can be used, where control unit 9 not only measures the difference of the signals from the temperature sensors 7, 8, but also their sum, which allows to determine the thermal conductivity of the gas surrounding it. If the thermal conductivity is found to be different from the thermal conductivity of pure ammonia, a foreign gas must be present and an alert can be issued.

Sensor 4 can also be used by system controller 10 to detect a leakage downstream from it, in particular a leakage in valve 3. When valve 3 is closed, a leakage at this location leads to a gas flow at detector 4. Such a non-zero gas flow can be detected by detector 4. When detector 4 detects a non-zero gas flow when valve 3 is closed, an alert can be issued.

If the stores 1 are not heated and pressure inside ammonia containing section 2 is below ambient pressure, a leak at the location of valve 3 will lead to a gas flow at detector 4 from the downstream side. Such an inverse downstream-upstream gas flow over a sufficiently long period of time is also a typical indicator of a system malfunction.

Detector 4 advantageously is made of materials that withstand ammonia. In particular, a combined glass-plastics housing, as shown in U.S. Pat. No. 6,920,786, can e.g. be used.

The plastics part of the housing is advantageously a polyester, in particular PBT, or polyamide, but other materials can be used as well, such as PTFE, PTCFE, PP, PS, ABS, PE, PVC.

Alternative Gas and Flow Detectors:

In the above embodiment, a combined flow and gas detector was used.

In other words, the gas and flow detectors share their heater as well as their temperature sensors. It must be noted, though, that the two detectors can also use separate heaters and/or temperature sensors. For example, a temperature sensor associated with the gas detector does not necessarily have to be arranged upstream or downstream of heater 6, but it could also e.g. be arranged cross-stream (i.e. at right angles to the gas flow) from heater 6.

Also, neither the flow detector nor the gas detector requires two temperature sensors. A single temperature sensor may suffice, and even the heater itself can be used as temperature sensor It must be noted that, albeit advantageous, the combination of flow detector and gas detector in a single device is not a required aspect of the invention. In particular, the gas detector can e.g. be located at a distance from the flow sensor, advantageously in a region where the ammonia is not flowing. It may consist of a single heater and temperature sensor measuring the thermal conductance between heater and temperature sensor which depends on the gas composition.

Neither is the invention restricted to the use of thermal gas detectors, i.e. of gas detectors measuring a parameter depending on the thermal properties of the gas. Other types of gas sensors can be used as well, such as one or more of infrared sensors detecting gas-specific absorption properties in the infrared spectral range, electrochemical sensors, adsorptive or absorbtive sensors measuring the presence of foreign gas adsorbed or absorbed in a matrix, e.g. due to a change of dielectric properties of the matrix.

These types of sensors are known to the skilled person.

To improve leak monitoring, it is also possible to place more than one gas detector into ammonia containing section 2 of the system.

While there are shown and described presently preferred embodiments it is to be understood that the invention is not limited thereto but may otherwise be embodied and practiced within the scope of the following claims.

What is claimed is:

1. An ammonia storage system comprising:
an ammonia containing section;
a thermally activatable ammonia store disposed in said ammonia containing section;
a valve, wherein opening of the valve allows ammonia gas to flow out of the ammonia containing section through the valve and wherein when said valve is closed, in the absence of a leak, the ammonia containing section contains pure ammonia;

a duct of the ammonia containing section connecting the ammonia store to the valve;

a heater for thermally activating said ammonia store, wherein thermal activation of the ammonia store by the heater releases ammonia into said ammonia containing section, and further comprising a gas detector disposed in the ammonia containing section at the duct and configured to detect a thermal conductivity of gas within the ammonia containing section;

wherein the system is adapted to issue an alert if the detector detects a thermal conductivity different from the thermal conductivity of pure ammonia.

2. The ammonia storage system of claim 1 wherein the gas detector is adapted for measuring a gas flow in said duct.

3. The ammonia storage system of claim 1 wherein the gas detector comprises a heater, and wherein said heater is adapted for measuring a gas flow in said duct.

4. The ammonia storage system of claim 3 wherein the gas detector comprises at least one temperature sensor adapted to measure a temperature change induced by said heater.

5. The ammonia storage system of claim 4 further comprising at least a first and a second temperature sensor located at different positions in respect to said heater with said heater being arranged between said first and second temperature sensor such that one of said temperature sensors is arranged upstream and the other one of said temperature sensors is arranged downstream of said heater.

6. The ammonia storage system of claim 5 further comprising a control unit designed for calculating said gas flow by using a difference between signals from said first and said second temperature sensor and designed for detecting the presence of a gas other than ammonia from the signal of at least one of said temperature sensors.

7. The ammonia storage system of claim 6 wherein said control unit is designed for detecting the presence of a gas other than ammonia by using a sum of signals from said first and said second temperature sensor.

8. The ammonia storage system of claim 2 further comprising a system controller adapted to detect a leak downstream from said flow detector by detecting a non-zero flow at said flow detector when said valve is closed.

9. A method for operating the ammonia storage system of claim 1 wherein said gas detector is operated at least when said ammonia store is not being activated in order to detect said gas other than ammonia.

10. The method of claim 9 wherein a thermal flow detector is a duct of said ammonia containing section is used for measuring an ammonia flow in said duct as well as for detecting said gas other than ammonia.

11. The method of claim 10 wherein said flow detector is used for measuring a leak downstream from said flow detector by detecting a non-zero flow or a downstream-upstream flow.

12. Use of the system of claim 1 as an ammonia source in a vehicle for controllably releasing ammonia in a Selective Catalytic Reduction (SCR) process for the catalytic decomposition of $NO_x$ compounds.

13. The ammonia storage system of claim 1, wherein the storage system is provided in a vehicle for controllably releasing ammonia in a Selective Catalytic Reduction (SCR) process for the catalytic decomposition of $NO_x$ compounds.

14. An ammonia storage system comprising:
an ammonia containing section;
a thermally activatable ammonia store disposed in said ammonia containing section;
a valve, wherein opening of the valve allows ammonia gas to flow out of the ammonia containing section through the valve and wherein when said valve is closed, in the absence of a leak, the ammonia containing section contains pure ammonia;
a duct of the ammonia containing section connecting the ammonia store to the valve;
a heater for thermally activating said ammonia store, wherein thermal activation of the ammonia store by the heater releases ammonia into said ammonia containing section, and further comprising
a gas detector disposed in the ammonia containing section at the duct,
wherein said gas detector is adapted to detect the presence of a gas other than ammonia in said ammonia containing section by measuring a heat capacity of gas within the ammonia containing section.

15. The ammonia storage system of claim 1, wherein said thermally activatable ammonia store comprises ammonia physically or chemically bound in a solid storage matrix.

16. The ammonia storage system of claim 2, wherein said thermally activatable ammonia store comprises ammonia physically or chemically bound in a solid storage matrix.

17. The ammonia storage system of claim 3, wherein said thermally activatable ammonia store comprises ammonia physically or chemically bound in a solid storage matrix.

18. The ammonia storage system of claim 7, wherein said thermally activatable ammonia store comprises ammonia physically or chemically bound in a solid storage matrix.

19. The ammonia storage system of claim 8, wherein said thermally activatable ammonia store comprises ammonia physically or chemically bound in a solid storage matrix.

20. The ammonia storage system of claim 14, wherein said thermally activatable ammonia store comprises ammonia physically or chemically bound in a solid storage matrix.

* * * * *